US006120864A

United States Patent [19]

Chiricosta et al.

[11] Patent Number: 6,120,864

[45] Date of Patent: Sep. 19, 2000

[54] ANTI-STATIC ROLL COVER

[75] Inventors: Robert A. Chiricosta, Lexington; Thomas W. Harris, Ashland, both of Mass.; Stephen P. Major, Scunthorpe, United Kingdom; Jeremy M. Oakhill, Embourg, Belgium; Douglas J. Pate, Jefferson; Artis Clifford Bufford, Kershaw, both of S.C.

[73] Assignee: BBA Nonwovens Simpsonville, Inc., Simpsonville, S.C.

[21] Appl. No.: 09/025,050

[22] Filed: Feb. 17, 1998

[51] Int. Cl.$^{7}$ ........ B32B 1/08

[52] U.S. Cl. ........ 428/36.1; 428/92; 428/95; 442/306; 442/308; 15/1.51; 15/100; 15/102; 15/230

[58] Field of Search ........ 442/306, 308; 428/85, 36.1, 92, 95; 66/194; 15/1.51, 230, 100, 102

[56] References Cited

U.S. PATENT DOCUMENTS

| | | | |
|---|---|---|---|
| 368,315 | 8/1887 | Bathrick . | |
| 577,300 | 2/1897 | Harris . | |
| 2,202,812 | 6/1940 | Davis | 19/140 |
| 3,235,772 | 2/1966 | Gurin | 317/2 |
| 3,582,444 | 6/1971 | Ngo et al. | 161/65 |
| 3,635,158 | 1/1972 | Budinger | 101/147 |
| 3,666,550 | 5/1972 | Okuhashi et al. | 117/217 |
| 3,677,233 | 7/1972 | White, Jr. | 119/157 |
| 3,867,027 | 2/1975 | Weigl | 355/8 |
| 3,985,435 | 10/1976 | Suzuki et al. | 355/4 |
| 3,986,530 | 10/1976 | Maekawa | 139/425 R |
| 3,993,021 | 11/1976 | Kline | 118/651 |
| 4,392,177 | 7/1983 | Geyken | 361/221 |
| 4,402,267 | 9/1983 | DeMoore | 101/419 |
| 4,599,943 | 7/1986 | Kobler | 101/217 |
| 5,142,759 | 9/1992 | Bonander et al. | 29/130 |
| 5,394,224 | 2/1995 | Irobe | 355/219 |
| 5,415,098 | 5/1995 | Ward | 101/493 |
| 5,508,879 | 4/1996 | Kitamura et al. | 361/221 |
| 5,855,037 | 1/1999 | Wieloch et al. | 15/256.5 |

*Primary Examiner*—Terrel Morris
*Assistant Examiner*—Cheryl Juska
*Attorney, Agent, or Firm*—Ostrager Chong & Flaherty

[57] ABSTRACT

A transfer roll cover has an inner surface made of conductive and elastic material to fit snugly around and make conductive contact with a transfer roll, and an outer surface made of looped yarns which are attached to the inner surface and have outer looped ends which make light rolling contact with a sheet transported over the transfer roll. The looped yarns are a composite of a cleaning yarn for cleaning particulate contaminants and an antistatic yarn for removing static charges from the transported sheet. In a preferred embodiment, the transfer roll cover has an inner surface made of nylon knitted yarn as a base yarn that holds the cover together and a LYCRA™ inlayed yarn which has an elasticity that allows the cover to stretch over and fit snugly onto the transfer roll. As an alternative, a heat-shrinkable polyvinyl acetate (PVA) yarn may be used as the elastic material. The preferred outer surface includes rayon knitted yarn with looped outer ends as the cleaning yarn, and BEKINTEX™ conductive knitted yarn with looped outer ends as the antistatic yarn.

9 Claims, 1 Drawing Sheet

ANTI-STATIC ROLL COVER

TECHNICAL FIELD

This invention generally relates to a roll cover for printing presses and web fed converting equipment, and more particularly, to a roll cover having a simplified construction with anti-static and particulate removal properties.

BACKGROUND OF INVENTION

Static buildup on preprinted sheet material is an historic and troublesome problem for the printer. Static charges tend to build up when the sheet or web material is transported through a printing press. The resulting static buildup can cause web/sheet guidance problems. A second problem involves particulate contamination on the surface of the preprinted sheet. Particulate contamination is strongly attracted to a statically charged sheet or web and often degrades print quality.

Printing press manufacturers have attempted to deal with the static charge buildup problem by using various types of static elimination devices which are wrapped around printing rolls or festooned around a printing press. These devices conduct static charges to a ground by contacting or dragging against the surface of the sheet or web material as it passes through the press.

For example, in U.S. Pat. No. 3,235,772 to Gurin, a printing blanket is provided for conducting electrostatic charges away from a sheet to an underlying metal roll mounting the blanket. The printing blanket may have an elastomeric outer layer with conductive pigment embedded therein in contact with conductive intermediary and/or backing layers wrapped on the printing cylinder. In U.S. Pat. No. 3,867,027 to Weigl, drum rollers made of an electrically conductive mat of metallized fibers are provided for removing static charges from continuously transported sheet material. In U.S. Pat. No. 5,508,879 to Kitamura, a charge removal brush for a photocopier is constructed with long conductive filaments planted in a conductive cloth wrapped around a metal shaft.

In U.S. Pat. No. 3,635,158 to Budinger, a printing roller is provided with a high density felt of polyester fibers adhered to an underlying core for removing debris and particles from transported sheets. The felted layer can be formed on a heat-shrinkable tube of PET fibers that is slipped over the roller core and shrunk down to securely grip the roller core. The felted layer is used to remove particles from the transported sheets, but is not used for static charge removal.

The prior art thus shows the general concept of using a printing roll blanket or brush having an outer conductive layer or fibers for removal of static charges to a conductive core, or a felted layer as a roll cover for particulate removal. The prior art devices are effective under limited conditions but do not solve the problem entirely. Trials have shown that in some circumstances the use of a cover to remove particulates from the sheets can exacerbate static problems and cause particulate contamination to be attracted to the sheets later in the process. It is especially desirable to provide a transfer roll cover that is convenient to install and replace on a transfer roll and that can both dissipate static charges effectively and remove particulate contaminants from printed sheet or web material.

SUMMARY OF INVENTION

In accordance with the present invention, a transfer roll cover comprises an inner surface made of conductive and elastic material to fit snugly around and make conductive contact with a transfer roll, and an outer surface made of looped yarns which are attached to the inner surface and have looped outer ends which make light rolling contact with a sheet transported over the transfer roll. The looped yarns are a composite of a cleaning yarn for cleaning particulate contaminants from the surface of the transported sheet and an antistatic yarn for removing static charges from the sheet.

In a preferred embodiment, the transfer roll cover has an inner surface which includes an elastic or heat-shrinkable yarn and a nylon base yarn that provides strength and holds the cover together. This enables the roll cover to be installed snugly onto the transfer roll and to transfer electrostatic charges to the roll. The outer surface consists of a looped rayon yarn for cleaning the preprinted sheet, and a looped conductive yarn to provide the antistatic properties. The conductive looped yarns are knitted into the roll cover structure in such a manner that they intertwine with the inner surface and make conductive contact with the transfer roll thus providing a direct conductive path between the printed sheet and the roll to ensure that electrostatic charges are dissipated.

The transfer roll cover of the present invention solves the static charge buildup problem while at the same time cleans the surface of the preprinted sheet or transported web material. It is also easy to install, inexpensive, and disposable, yet effective to solve the static and debris problems.

Other objects, features, and advantages of the present invention will be explained in the following detailed description of the invention having reference to the appended drawings.

DETAILED DESCRIPTION OF INVENTION

Figure 1:
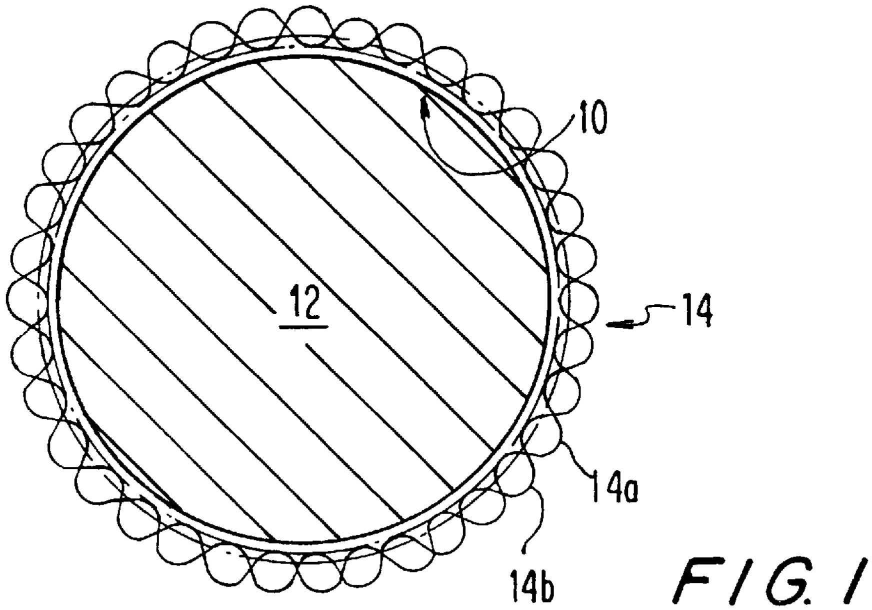
FIG. 1 is a cross-sectional view of a transfer roll cover in accordance with the present invention.

Referring to FIG. 1, a transfer roll cover in accordance with the present invention has an inner surface 10 made of conductive and elastic material that fits onto and makes conductive contact with a transfer roll 12 which is made of metal or other conductive material. Preferably, the inner surface 10 includes a combination of elastic yarns to provide elasticity and nylon yarns to provide strength. The elastic yarns ensure that the sleeve fits snugly around the transfer roll 12. A suitable elastic yarn is sold under the tradename 420 Denier LYCRA™ by Dupont Company in the U.S. A suitable nylon yarn is sold under the tradename 70 Denier Two-Ply Nylon by Jefferson Mills, Inc., in the U.S. An alternate inner surface construction can utilize heat-shrinkable yarn or other material (in place of the elastic yarn) which is activated by applying heat to the cover after the cover is installed on the roll.

The outer surface 14 of the roll cover is made of a composite of looped yarns which are intimately intertwined with the yarns of the inner surface 10 during a yarn knitting process, for example. The looped yarns preferably comprise a cleaning yarn 14*a* such as rayon to provide cleaning properties and a conductive yarn 14*b* to provide antistatic properties. A suitable rayon yarn is sold under the tradename 200 Denier Rayon by Kuraray Company in Japan. A suitable conductive yarn is sold under the tradename BK NM 50/1 by Bekintex NV in Belgium. The inner ends of the looped yarns are knitted with the yarns of the inner surface to form a knitted backing that fits snugly on and makes good conductive contact with the transfer roll. The outer ends of the looped yarns make light rolling contact with a sheet 20 transported over the transfer roll 12 in order to perform its antistatic and particulate removal functions without adversely affecting sheet transport over the roll. The static charges are conducted by the conductive yarns 14*b* from the outer surface to the inner surface of the cover then to ground via the metal transfer roll.

As a surprising aspect of the invention, it is found that the rolling contact between the looped antistatic yarns of the roll cover and the sheet material effectively dissipates static charges. Combining the looped rayon cleaning yarns with the antistatic yarns allows the particulate removal function to be performed effectively at the same time as static dissipation.

A suitable transfer roll cover may be constructed by utilizing a combination of yarns for their respective functions:

1. 70 denier, 2 ply nylon knit yarn used as a base yarn that holds the fabric together. The nylon knit yarn is preferably in the range of 5% to 20% of the total yarn content of the cover.

2. 420 denier LYCRA™ inlayed yarn is used to provide elasticity that allows the cover to stretch over the transport roll. The elasticity in the LYCRA™ yarn prevents the cover from "walking" on the transfer roll during the process of transferring sheet material. The LYCRA™ inlayed yarn is preferably in the range of 10% to 30% of the total yarn content of the cover. 1000 denier polyvinyl acetate (PVA) yarn may be substituted for the LYCRA™ inlayed yarn. If PVA yarn is used, the application of heat is required to shrinkfit the cover to the transfer roll.

3. 200 denier rayon is used as a Terry yarn which is knitted to form loops over sinkers. The looped rayon yarn serves as a cleaning yarn which cleans the surface of the sheet or web material transported over it. The looped rayon yarn is preferably in the range of 30% to 60% of the total yarn content of the cover.

4. 50/1 BK BEKINTEX™ conductive yarn, is used as a Terry yarn which is knitted to form loops over sinkers. The looped conductive yarn serves as an antistatic yarn which removes static charges from the surface of the sheet or web material transported over it. The looped antistatic yarn is preferably in the range of 15% to 40% of the total yarn content of the cover.

A preferred example of the transfer roll cover is a Terry knitted fabric constructed of four yarns:

| Yarn Description | % of Sleeve Fabric | Supplier |
|---|---|---|
| 200 denier rayon | 47% | Kuraray (Japan) |
| 70 denier 2-ply nylon | 10% | Jefferson Mills |
| 420 denier LYCRA | 18% | Dupont |
| BK NM 50/1 | 25% | Bekintex (Belgium) |

The four yarns of the preferred example of the roll cover may be knitted together using knitting machines manufactured by Moorgate or Tritex Company of Leicester, England. It should be understood that knitting machines produced by other manufacturers could also be used to knit the roll cover.

Figure 2:
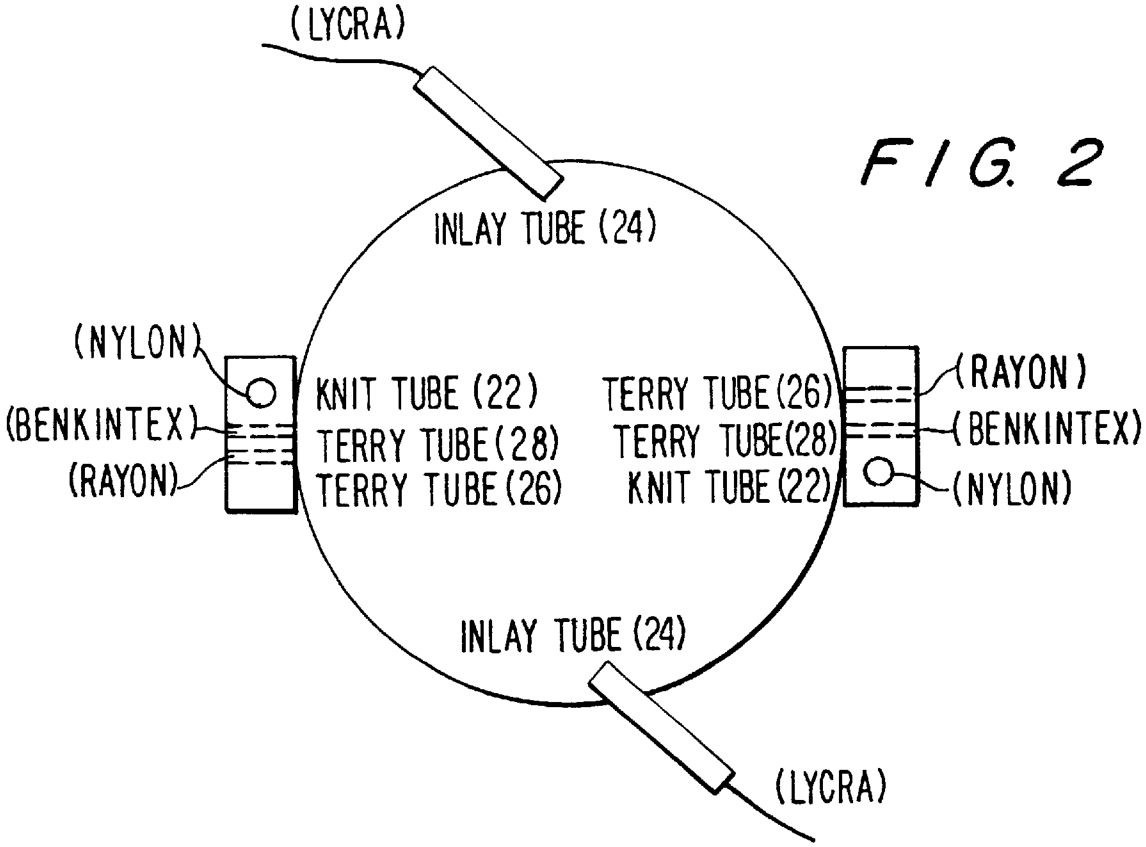
FIG. 2 is a top view of a knitting head of a knitting machine for knitting (forming a composite of yarns for) the outer fabric of the transfer roll cover.

FIG. 2 illustrates the thread-up of a knitting head 20 of a knitting machine using the four types of yarns for the transport roll cover fabric. The 70 denier, 2 ply nylon yarn is applied through opposing knit tubes 22. The 420 denier LYCRA™ yarn is applied through opposing inlay tubes 24. The 200 denier rayon and 50/1 BEKINTEX™ BK yarns are applied through opposing terry tubes 26, 28, respectively. The resulting fabric has a total weight of 37.5 grams/linear inch of the cover. The cover has a thickness of approximately 3/16 inch (lofted).

In summary, the transfer roll cover of the present invention utilizes the composite of outer looped cleaning and antistatic yarns to make rolling contact with the transported sheet so as to effectively remove static charges and at the same time clean particulate contaminants from the surface of the transported sheet. The elastic or heat-shrinkable material of the inner surface allows the outer surface to be securely anchored to the cover while at the same time enabling the cover to be easily installed or removed from the transfer roll. The overall construction of the roll cover is also simple and inexpensive to fabricate.

It is understood that many modifications and variations may be devised given the above description of the principles of the invention. Other types of conductive and elastic materials may be used for the inner part of the transfer roll cover, and other yarns or fibrous materials may be substituted for the cleaning and static removal functions of the outer part of the roll cover. It is intended that all such modifications and variations be considered as within the spirit and scope of this invention, as it is defined in the following claims.

We claim:

1. A transfer roll cover comprising:

an inner surface made of conductive and elastic material to fit snugly around and make conductive contact with a transfer roll, and an outer surface made of looped yarns which are attached to the inner surface and have outer looped ends which make rolling contact with a sheet transported over the transfer roll, wherein said looped yarns are a composite of a cleaning yarn for cleaning particulate contaminants from the surface of the transported sheet and an antistatic yarn for removing static charges from the sheet.

2. A transfer roll cover according to claim 1, wherein the inner surface includes a combination of conductive and elastic yarns.

3. A transfer roll cover according to claim 1, wherein the inner surface includes a combination of conductive and heat-shrinkable yarns.

4. A transfer roll cover according to claim 1, wherein the looped yarns of the outer surface includes a rayon yarn as the cleaning yarn.

5. A transfer roll cover according to claim 1, wherein the looped yarns of the outer surface includes a conductive yarn as the antistatic yarn.

6. A transfer roll cover according to claim 1, wherein the inner surface includes a nylon yarn as a base yarn that holds the cover together and a LYCRA™ inlayed yarn which has an elasticity that allows the cover to stretch over and fit snugly onto the transfer roll, and the outer surface includes a rayon yarn as the cleaning yarn and a conductive yarn as the antistatic yarn.

7. A transfer roll cover according to claim 6, wherein the cover is comprised of from 5% to 20% of 70 denier, 2 ply nylon yarn as the base yarn, from 10% to 30% of 420 denier elastic inlayed yarn, from 30% to 60% of 200 denier rayon Terry yarn, and from 15% to 40% of conductive Terry yarn.

8. A transfer roll cover according to claim 1, wherein the inner surface of the roll cover includes a polyvinyl acetate (PVA) yarn as the elastic material.

9. A transfer roll cover according to claim 8, wherein the inner surface includes a nylon yarn as a base yarn that holds the cover together and a polyvinyl acetate (PVA) yarn which allows the cover to be heat-shrunk onto the transfer roll upon application of heat, and the outer surface includes a rayon yarn as the cleaning yarn and a conductive yarn as the antistatic yarn.

* * * * *